June 18, 1935.      W. K. McMILLAN      2,005,436
TRACK ASSEMBLY
Original Filed Feb. 23, 1932   3 Sheets-Sheet 1
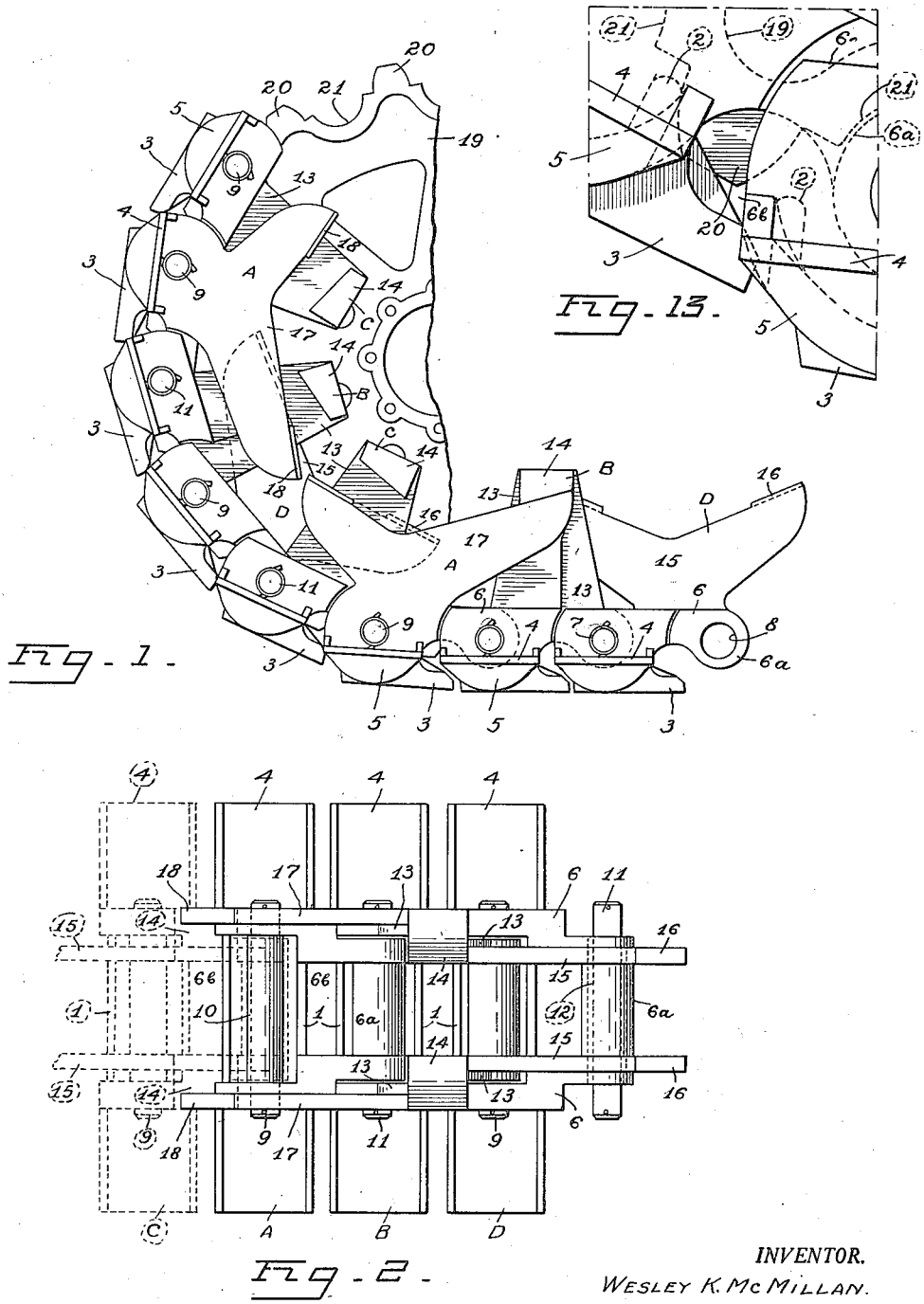
INVENTOR.
WESLEY K. McMILLAN.
BY Jas. M. Naylor
ATTORNEY June 18, 1935. W. K. McMILLAN 2,005,436
TRACK ASSEMBLY
Original Filed Feb. 23, 1932 3 Sheets-Sheet 2
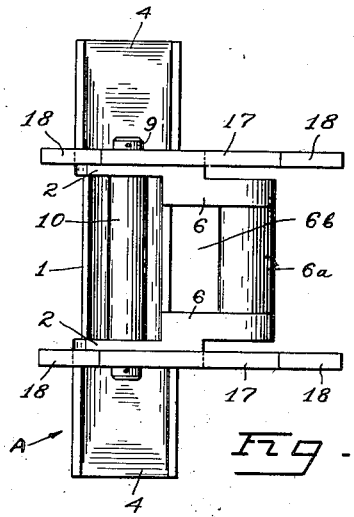
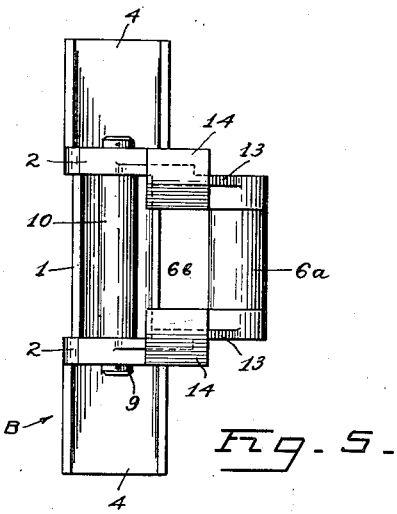
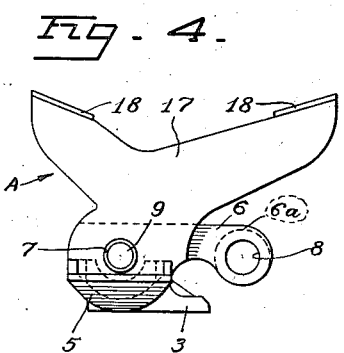
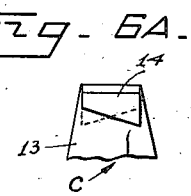
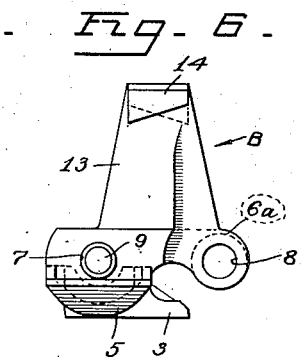
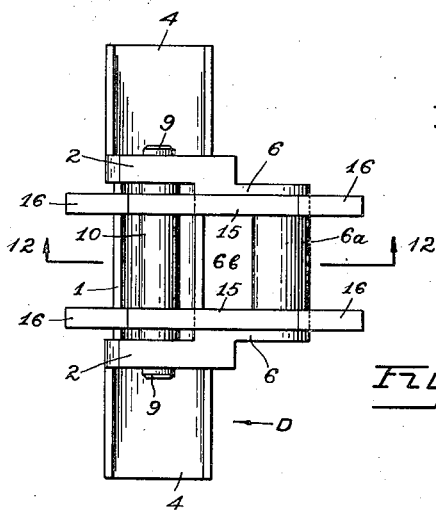
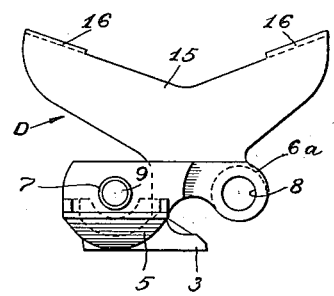
INVENTOR.
WESLEY K McMILLAN.
BY
ATTORNEY

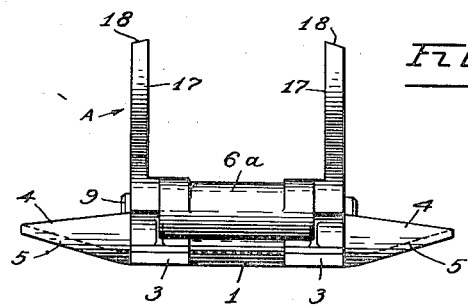
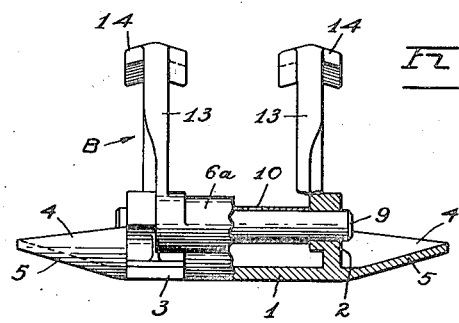
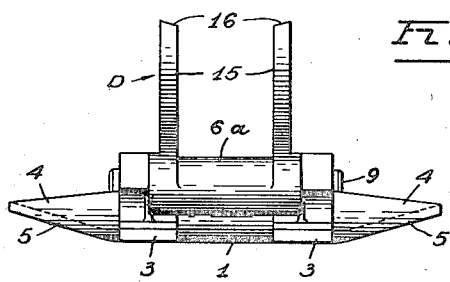
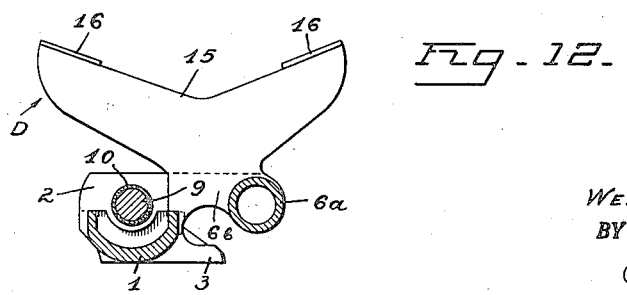

Patented June 18, 1935

2,005,436

UNITED STATES PATENT OFFICE 2,005,436

TRACK ASSEMBLY

Wesley K. McMillan, San Francisco, Calif., assignor, by mesne assignments, to George H. Hauerken, trustee for McMillan-Miller Engineering Co., San Francisco, Calif., a copartnership, bankrupt Application February 23, 1932, Serial No. 594,638
Renewed November 19, 1934

5 Claims. (Cl. 305—10)

My invention relates to improvements in endless track laying assemblies and it consists of the combinations, constructions and arrangements hereinafter described and claimed.

An object of my invention is to provide an endless track laying assembly in which each link is cast in a single piece, the ground engaging surfaces of each link being rounded except for two small portions which are made flat. The sides of each of the ground engaging portions are inclined upwardly to prevent skidding.

The links have novel means for excluding mud, gumbo, snow or rocks thus preventing clogging of the parts.

Still further advantage lies in the provision of mud shearing members forming a part of adjacent links, these members also performing the additional function of providing rigid connection between the links while the latter are engaging the ground.

Other objects and advantages of the invention will appear as the specification proceeds, and the novel features will be particularly pointed out in the appended claims.

My invention is illustrated in the accompanying drawings forming a part of this specification, in which:

Figure 1 shows an endless track laying assembly in engagement with a sprocket wheel, Figure 2 is a plan view of several links of my track assembly, Figure 3 is a plan view of a link of the first type, Figure 4 is a side view of the same link, Figure 5 is a plan view of a link of the second type, Figure 6 is a side view of the latter, Figure 6A is a side view of a link of the third type, Figure 7 is a plan view of a link of the fourth type, Figure 8 is a side view of the said fourth type, Figure 9 is a rear view of a link of the first type, Figure 10 is a rear view of a link of the second type, partly shown in section, Figure 11 is a rear view of a link of the fourth type, Figure 12 is a section along line 12—12 of the Figure 7, and Figure 13 is enlarged detail of the link assembly on the sprocket.

In carrying out my invention I provide four types of links which are designated by the letters as A, B, C, and D, and I will first describe the type shown in Figs. 5, 6, and 10, that is, type B.

The link comprises a base having a semi-cylindrical portion 1 with up-standing ears 2 (see Figure 10). The base also has flat ground gripping portions 3 disposed at the ends of cylindrical portion 1. Figure 10 also shows the base as having extended portions 4 with flat upwardly inclined under-surfaces 5. The flat ground gripping portions or feet 3 prevent the base from marring roads or other finished surfaces over which the device travels, while the inclined flat surfaces 5 prevent lateral movement or skidding of the base over the ground. Such skidding would normally take place, when the device travels along the side of a hill and the said surfaces 5 prevent skidding under these circumstances.

The particular shape of the ears 2 is shown more clearly in Figures 3, 4 and 9 and it will be noted that they project rearwardly from the semi-cylindrical portion 1, as shown at 6, and are connected to each other by a cylinder 6a.

The ears 2 are provided with the aligned holes 7 to receive a pin 9, and a bushing 10 is mounted on the pin and disposed between the said ears. A bore 8 provided in the cylinder 6a, is of slightly larger diameter than the holes 7 in the ears 2, and receives a pin 11, similar to the pin 9, (see Figure 2), and a bushing 12. The pin 11 projects beyond the bore 8 and receives the ears of the next link. It should be noted that the portions 6 of the ears are set nearer each other so as to provide room for receiving the ears of the next link. In this way the adjacent ears overlap each other without increasing the width of the link assembly at the connecting points.

The base and ears just described are common to all of the links and therefore only the superstructure of the three kinds of links used will be set forth.

Each link has what I term shearing blades which extend above the base and ears. I will first describe the central blades, on the link B shown in Figures 5, 6 and 10.

Figure 6 shows the central blades 13 extending upwardly from and integral with the portions 6 of the ears 2. Downwardly inclined stops 14 extend from the tops of the blades 13 and project beyond both sides thereof as shown in Figure 10. It will be noted that the contact surfaces of the stops 14 are cast at oblique angles to the perpendicular of the blades 13, the angle on the inner side of the blade being opposed to the angle of the stop on the outer side. The under surfaces of the stops in each instance are bevelled outwardly and downwardly to neatly fit the correspondingly bevelled upper ends 16 and 18 of the blades 15 and 17 of the links D and A, respectively. The link C is identical with the link B with the exception of the stops 14, the contact surfaces of which are obliquely inclined opposite to the arrangement shown in Figure 6 (see Figure 6A).

In Figures 7 and 8 I show inner blades 15 in the shape of a V extending upwardly from the portions 6. These blades have a shearing contact with the inner surfaces of the central blades 13 of the adjacent links. The tops of the branches of the V are inclined at 16 and contact with the undersurfaces of the stops 14.

Figures 3 and 4 show V shaped outer blades 17 integral with the ears 2 and extending upwardly so as to have a shearing contact with the outer surfaces of the central blades 13 of adjacent links. The upper ends of the V's of the blades 17 are inclined at 18 and are designed to contact with the undersurfaces of the outer stops 14.

In assembling the links, a link D having the inner blades 15 is placed adjacent to a link B having the central blades 13. Next in line I have the link A with the outer blades 17, and next to it link C. This arrangement is continued throughout the length of the track assembly. The pins 9 are inserted through the bushings 10 and the cylinder 6a of the adjacent link. In assembling the links it should be borne in mind that the pins 9 and 11 are identical and so are likewise the bushings 10 and 12. These parts have been given separate numbers solely for the purpose of clarity in describing the links individually.

The endless track is passed around a sprocket 19 shown in Figure 1 and in enlarged detail in Figure 13. As the links pass around the sprocket, the arms of the blades 15 and 17 move away from stops 14. The pins 9 and 11 permit this pivoting action between the links. The teeth 20 of the sprocket ride between adjacent cylinders 6a while the recesses 21 between the teeth receive the cylinders 6a.

It will be noted as the links move around with the sprocket and then form a straight track laying portion, that the inner and outer blades 15 and 17 will move over the inner and outer surfaces of the central blades 13 and shear off any foreign matter adhering on the abutting surfaces. The blades or arms stand up some eight inches above the rail surface and fit neatly against the sprockets, not allowing large material to get between the arms and the sprocket face. Any small material finding its way between the sprocket and the links will be crushed by the weight of the device.

The links or shoes have openings 6b between the cylinders or spool centers 6a of a suitable size to allow the sprocket teeth to enter the openings and push out any material adhering to the shoe, as illustrated in Figure 13. This prevents clogging by eliminating any building up of material on the track.

The shoes or links are in one piece and only one large diameter pin 9 or 11 connects the adjacent shoes together.

The particular construction of the blades 13, 15, and 17 has been intended for following purposes: first, the beveled tops 16 and 18 of the links D and A cooperating with the stops 14 of the links B and C prevent material from adhering to the stops; second, when the aforesaid beveled tops 16 and 18 are pressed against the inclined under surfaces of the stops 14, the blades 15 and 17 are securely pressed against the central blades 13 thus assuring the shearing action of the blades and preventing their spreading apart; third, the shoes, forming a straight portion of the track, have their blades or arms 15 and 17 engaged with the stops 14 and in this way the shoes are interlocked. In case a rock or any other obstacle should get under the track and tend to lift one shoe after another, as the track passes over it, the interlocking feature will distribute the thrust intended for one link between several of them, thus providing smoother riding for the device and assuring longer life for the track.

Although I have shown and described only one form of my invention, it should be understood that various changes or modifications may be made within the scope of the annexed claims without departing from the spirit of the invention.

I claim as my invention:

1. In combination, a shoe having upwardly extending arms with stops, a second shoe pivotally connected to the first at one side thereof and having arms producing shearing action on one side of the first arms and engageable with certain of the stops, and a third shoe pivotally connected at the other side of the first shoe and having arms producing a shearing action on the other sides of the first named arms.

2. An endless track assembly composed of a plurality of links of two types arranged alternately, each of said links having an aperture in its main portion to receive a pin engaging the link ahead and a rearwardly projecting apertured member to permit connection to the next succeeding link, each of said links having a base and carrying upwardly projecting arms, the arms of the links of the first type being substantially vertical and having shoulders disposed on the outer and inner sides thereof, the arms of the links of the second type projecting angularly beyond the points of connection of said links and being adapted to bear upon the under sides of said shoulders to arrest upward movement of one link with respect to the adjoining links.

3. An endless track assembly composed of a plurality of links of two types arranged alternately, each of said links having an aperture in its main portion to receive a pin engaging the link ahead and a rearwardly projecting apertured member to permit connection to the next succeeding link, each of said links having a base and carrying upwardly projecting arms, the arms of the links of the first type being substantially vertical and having stops disposed on the outer and inner sides thereof, the arms of the links of the second type projecting angularly beyond the points of connection of the links and being adapted to bear upon the under side of said stops to arrest upward movement of one link with respect to the adjoining links.

4. An endless track assembly composed of a plurality of links of two types arranged alternately, each of said links having an aperture in its main portion to receive a pin engaging the link ahead and rearwardly projecting apertured members to permit connection to the next succeeding link, each of said links having a base and carrying upwardly projecting arms, the arms of the links of the first type being substantially vertical and having stops disposed on the outer and inner sides thereof, the arms of the links of the seocnd type projecting angularly beyond the points of connection of said links and bearing against the under sides of said stops, the arms of the link on one side of said link of the first named type engaging the stops disposed on the outer side of said arms while the arms of the link on the other side engage the inner stops.

5. An endless track assembly composed of a plurality of links of two different types arranged alternately, each of said links having an aperture in its main portion to receive a pin engaging the link ahead and rearwardly projecting apertured members to permit connection to the next succeeding link, each of said links having a base and upwardly projecting arms, the arms of the links of the first type being substantially vertical and having stops disposed on the outer and inner sides thereof, the arms of the links of the second type projecting angularly beyond the points of connection of said links and bearing against the under sides of said stops, the stops on the outer sides of said arms being disposed at opposite angles to the stops on the inner side of said arms.

WESLEY K. McMILLAN.